E. H. KETTELFORDER.
ANIMAL TRAP.
APPLICATION FILED FEB. 18, 1911.

1,003,466.

Patented Sept. 19, 1911.

Witnesses
Adelaide Kearns
R. E. Randle

Inventor
Edward H. Kettelforder,
By Robert H. Randle
his Attorney.

UNITED STATES PATENT OFFICE.

EDWARD H. KETTELFORDER, OF RICHMOND, INDIANA.

ANIMAL-TRAP.

1,003,466.  Specification of Letters Patent.  Patented Sept. 19, 1911.

Application filed February 18, 1911. Serial No. 609,436.

*To all whom it may concern:*

Be it known that I, EDWARD H. KETTELFORDER, a citizen of the United States, residing in the city of Richmond, county of Wayne, and in the State of Indiana, have invented a new and useful Construction in Animal-Traps, of which the following is a full, clear, and comprehensive specification and exposition, being such as will enable others to make and use the same with absolute exactitude to obtain the highest efficiency.

The object of my present invention, broadly speaking, is to provide an animal trap which will be strong and durable in construction, easy of operation, positive in action, and which can be made and sold at a comparatively low price.

More specifically stated my object is to provide a trap which is particularly intended for catching rats, wherein the rat caught thereby will be instantly killed and that without breaking the skin, thereby preventing the trap from becoming smeared with blood, and preventing other rats from being frightened away.

Other objects and particular advantages of my invention will be brought out in the following description, and that which is new and useful will be correlated in the appended claims.

The preferred manner for the construction of my invention is shown most clearly in the accompanying drawings, in which—

Figure 1:
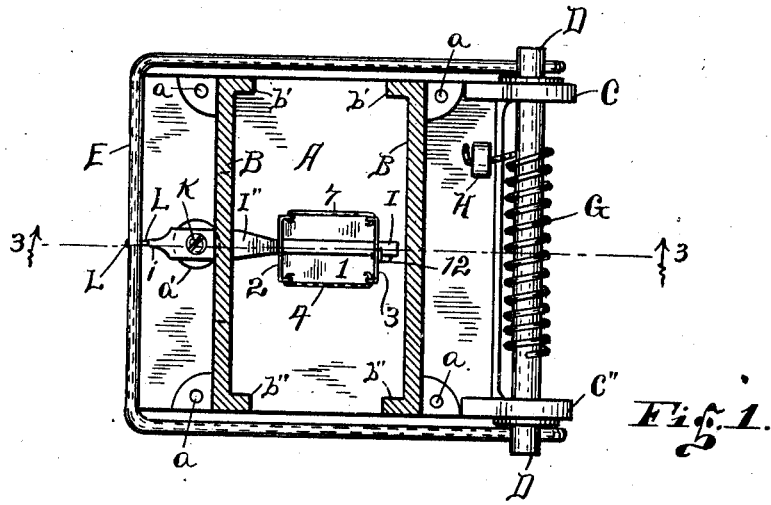
Figures 2, 3:
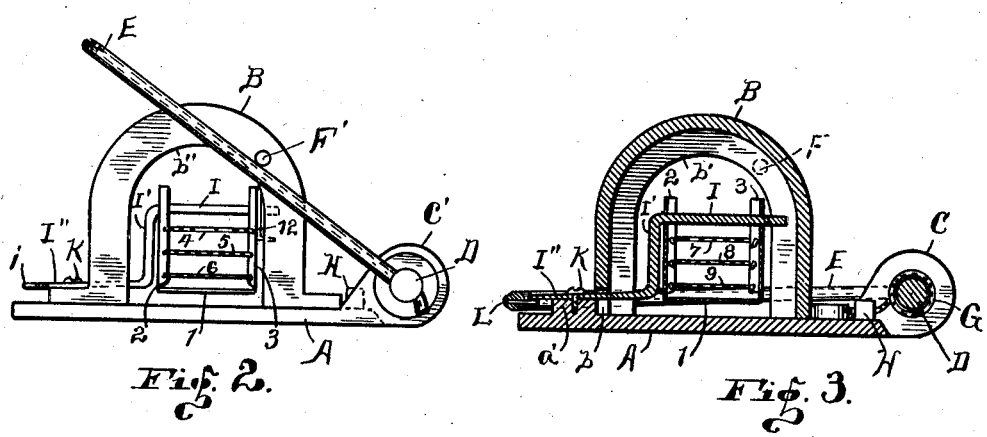
Figures 4, 5:
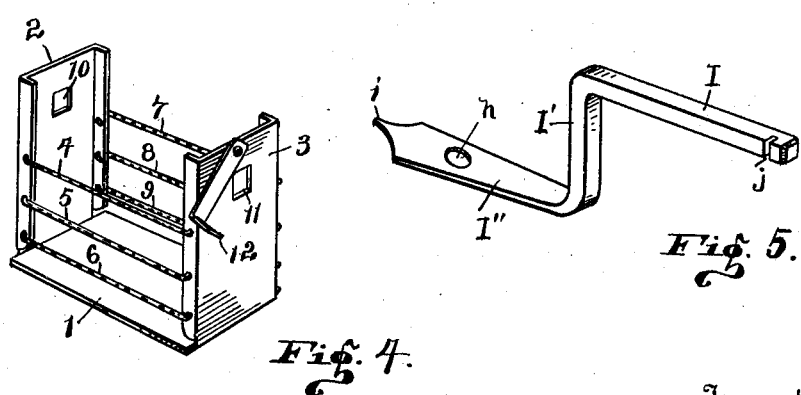

Figure 1 is a plan view of the lower portion of the trap, partly in section in order to show the interior of the trap. Fig. 2 is an end elevation of my trap, which is the same if taken from either end of the trap. Fig. 3 is a central cross sectional view, as taken on line 3—3 of Fig. 1; Fig. 4 is an isometrical detail view of the bait-cage; and Fig. 5 is an isometrical view of the trigger.

Similar indices denote like parts throughout the several views.

In order that the construction and the operation of my invention may be more fully understood and appreciated I will now take up a detailed description thereof in which I will set forth the invention as briefly and as comprehensively as I may.

In the drawings letter A denotes the base-member which is substantially flat, and it may be square or other shape in contour.

B denotes the arch-member, which is of the same length as is the width of the base, to which it is secured by four screws or rivets $a$. The arch member forms a passageway therethrough, with the base A as a floor therefor.

Extending out from the rear corners of the base A are the two ears C and C' in through the end portions of the shaft D, the latter being located parallel with the rear edge of the base A.

The deadfall E is made of a single length of heavy wire, or rod, formed U-shape, the end portions being reduced in diameter and fitting in cross apertures therefor formed through the end portions of the shaft D, the projecting ends being bent down (as in Fig. 2) to prevent them from being withdrawn. The sides of the deadfall E are adapted to move across the ends of the arch member B, near thereto, and the central portion of the deadfall is adapted to contact with the extreme outer portion of the front edge of the base A, as indicated in Fig. 3. The upward movement of the deadfall E is limited by means of the two pins F and F' which project out from the ends of the arch member B, at each end thereof.

Letter G denotes a helical spring whose convolutions are coiled loosely around the shaft D, extending between the ears C and C' but not thereto. One end of said spring is inserted through an aperture formed through the shaft D where it is rigidly secured. The other end of said spring is secured in the lug H, the latter being formed integral with, or secured to, the surface of the base A at the rear of the arch B. The tension or torsion of said spring is such as to normally retain the deadfall in contact with said pins F and F', and it is also adapted to move the deadfall upward (to the position shown in Fig. 2) with considerable force when it is released from the horizontal position in which it is shown in Fig. 3.

The trigger, as shown in Fig. 5, comprises the arm portion I; the short vertical portion I'; and the flat horizontal portion I'', the latter terminating in the point $i$. The parts I and I' of the trigger are formed square in cross section. Formed in the arm portion I, near the outer end thereof, is a notch $j$. Formed through the part I'', a short distance back from the point $i$, is a round aperture $h$.

Rising from the center of the base A, immediately in front of the arch B, is a round face $a'$ having a threaded aperture therein to receive the screw K. Said screw is disposed through said aperture $h$ whereby the trigger is pivoted in position, as indicated. There is a slot $b$ (Fig. 3) formed through the center of the lower edge of the front of the arch B through which may operate the trigger, allowing the trigger to swing horizontally.

Secured in and extending back from the center of the deadfall E is a pin L which is adapted to engage the point $i$ when the trap is set.

The bait-cage comprises a bottom 1 and the two ends 2 and 3, the ends being parallel with each other and extending up at right-angles to the bottom, with which they are integral. The edges of the ends 2 and 3 are turned inward at right-angles to the ends and with apertures formed therethrough in which are secured the wires 4, 5 and 6, on one side; and wires 7, 8 and 9 on the other side. Formed through the upper central portion of the ends 2 and 3 are the square apertures 10 and 11, respectively, which are in alinement with each other, and which are of such size as to allow the arm member I of the trigger to slide therein, as in Fig. 3. Pivoted on the rear end of the cage, that is to member 3, and above the aperture 11, is a catch 12. When the cage is in position on the arm 8 then the catch 12 may be turned to engage in the notch $j$ which will lock the cage in operative position on the trigger as in Fig. 1.

When it is desired to remove the bait-cage (or to replace it) one has only to swing the trigger to the right or to the left, then release the catch 12, which will allow the cage to be slid from off the arm I, removing it from the trap through one of the openings in the end of the arch member B. After the cage has been provided with bait, which should be placed therein, then the cage is replaced as before, as in Figs. 1, 2 and 3. Desiring now to set the trap one has only to press down the deadfall E (against the resiliency of spring G) to the position shown in Fig. 3, after which the trigger is to be turned to the position shown in Fig. 1 which will cause the pin L to be engaged under the point $i$, as in Fig. 3, thereby holding the deadfall in set position, that is in the position shown in Fig. 3. Now should a rat or other animal attempt to eat the bait from the basket it is evident that the animal will of necessity have to insert its head into one or the other of the end openings of the arch member B, thereby placing his body across one of the side arms of the deadfall. It is apparent that should the animal push, or pull, the cage in either direction that it will cause the point $i$ to slide off the pin L thereby releasing the deadfall, which when released will quickly spring upward which of course will detain the animal between one of the sides of the deadfall and one of the chimes $b'$ or $b''$ which are formed in the ends of the arch member B. The said chimes $b'$ and $b''$ are adapted to engage the back of the neck of the animal and prevent the animal from withdrawing itself from the trap.

In practice I prefer that the within described trap shall be made entirely of metal, the members A and B being ordinary castings, however, if desired the member A may be made of wood or other material.

I desire that it be understood that various changes may be made in the several details of construction without departing from the spirit of my invention or sacrificing any of the advantages thereof.

Having now fully shown and described my invention and its operation what I claim and desire to secure by Letters Patent of the United States, is—

1. In an animal trap, the combination with the base, an arch member mounted on the base and extending thereacross, a spring actuated U-shaped deadfall having its ends secured in a rotatable shaft whereby the side of the deadfall will operate across the ends of the arch member, a trigger for locking the deadfall down in set position, a bait-basket removably connected to the trigger and located inside the arch member, whereby as the bait-basket is moved laterally the deadfall will be released, all substantially as shown and described.

2. An animal trap comprising, a base, a solid arch member secured to the top of the base and extending thereacross, a shaft pivoted to the base parallel with and to one side of the arch member, a U-shaped deadfall having its ends secured in said shaft with its sides adapted to move across the ends of the arch member and its central portion adapted to engage the top of the base member, a helical spring disposed around said shaft and adapted to hold the deadfall resiliently in its upper position, a pin extending inward from the central portion of the deadfall, a trigger pivoted to the top of the base and extending inside said arch member, a point on the outer end of the trigger to engage over said pin in the deadfall, a bait-basket removably mounted on the inner portion of the trigger inside the arch member, and means for locking the bait-basket on the trigger, all substantially as shown and described.

3. An article of manufacture, an animal trap comprising a base having ears at two of its corners, a shaft pivoted in said ears, a U-shaped deadfall having its ends secured in said shaft and extending forward with its central portion adapted to contact with the forward portion of the base, an arch member secured to the top of said base and extending across the base to near the sides of said deadfall, a spring for normally holding the deadfall up away from the base, pins extending out from the ends of the arch member against which the sides of the deadfall engage, a trigger pivoted over the top of the base with its outer point adapted to hold the deadfall down against the base and against the resiliency of said spring, the inner portion of the trigger being formed square in cross section and located in the interior of the arch member, a bait-basket detachably mounted to the square portion of the trigger and on the interior of the arch member, and means whereby the trigger may be moved laterally upon its pivot, all substantially as set forth.

In testimony whereof I have hereunto subscribed my name to this specification in the presence of two subscribing witnesses.

EDWARD H. KETTELFORDER.

Witnesses:
 R. E. RANDLE,
 R. W. RANDLE.

Copies of this patent may be obtained for five cents each, by addressing the "Commissioner of Patents, Washington, D. C."